April 13, 1965 N. S. BERS 3,178,600
MOTOR STRUCTURE INCLUDING SPHERICAL WINDINGS
Original Filed Jan. 25, 1960 5 Sheets-Sheet 3

INVENTOR.
Naum S. Bers

AGENTS

INVENTOR:
Naum S. Bers

AGENTS

United States Patent Office 3,178,600
Patented Apr. 13, 1965

3,178,600
MOTOR STRUCTURE INCLUDING SPHERICAL WINDINGS
Naum S. Bers, Los Angeles, Calif., assignor, by mesne assignments, to Thompson Ramo Wooldridge Inc., Cleveland, Ohio, a corporation of Ohio
Original application Jan. 25, 1960, Ser. No. 4,370, now Patent No. 3,052,859, dated Sept. 4, 1962. Divided and this application Dec. 13, 1961, Ser. No. 158,977
4 Claims. (Cl. 310—166)

This is a division of my copending application entitled "Function Generator," filed January 25, 1960, Serial Number 4,370, now Patent Number 3,052,859. This invention relates to apparatus for indicating angular displacements of one member relative to a second member and more particularly relates to apparatus for producing signals representing a function of the angular displacement between a pair of members. The invention is particularly concerned with apparatus for producing signals representing a trigonometric function of the angular displacement between a pair of members. The invention also relates to a method of producing such a function generator.

Apparatus has been built for a number of years to measure the angular displacement of one member relative to a second member and to produce output signals representing trigonometric functions of such angular displacement. Such apparatus is used in a wide variety of different applications. For example, the apparatus may be used in machine tools to measure the angular positions of the cutter in the machine tool at successive instants of time or in various gimbaled structures to measure the relative angle between gimbals. By measuring such angular positions, signals can be produced to control the positioning of one element with respect to another in accordance with certain control signals.

Although the above is presented by way of examples, it will be appreciated that the apparatus can be used for controlling the angular positioning of any output member in accordance with the introduction of control signals representing the desired positioning of the member. It will also be seen that needs and uses for such apparatus are becoming increasingly widespread as systems for automatically controlling the angular position between different members in the systems become prevalent.

In general, the resolvers now in use include a primary winding electrically excited to produce a magnetic field. The primary winding is generally formed from a plurality of turns disposed on a cylindrical member such as a rotor. A secondary winding formed from a plurality of turns is magnetically coupled to the primary winding and is also supported on a cylindrical member such as a stator. The turns in the primary and secondary windings may be disposed so that the secondary winding produces a signal having characteristics approximating a trigonometric function of the angular displacement between the windings.

Considerable effort has been made to develop resolvers and other apparatus which accurately measure angular displacements of one member relative to another and which produce signals accurately representing trigonometric functions of such angular displacements. The effort to develop such apparatus has not been entirely successful, even though the effort has been made on a concentrated basis for at least a few decades. One difficulty arises from the fact that the magnetic field produced in the gap between the primary winding and the secondary winding has discontinuities when the windings are provided with cylindrical configurations. Such discontinuities result in part from the finite lengths of the cylindrical configurations, the discontinuities being produced at the axial ends of the cylinders. Such discontinuities tend to produce errors in the output voltage induced in the secondary winding. Errors are also produced in the resolvers now in use because of the reflection from the secondary winding to the primary winding of load impedances causing high and variable signal distortions.

This invention provides apparatus for producing output signals representing more accurately than in previous resolvers a trigonometric function of the displacement of one member relative to another. The invention produces such an output signal by disposing first and second windings in a novel configuration and relationship with respect to each other. The windings on the first and second members in this invention are continuous helical coils with pluralities of turns wound on concentric spherical members of high magnetic permeability. Each coil is provided with a uniform current density along a particular diameter which corresponds to its axis of symmetry.

Because of the particular geometry and material used in this invention, sinusoidal current sheets are produced on each of the two magnetic surfaces facing the common air gap between the concentric windings. The magnetic field thus produced in the gap is substantially radial with no discontinuities. By providing such a relationship, the mutual inductance between stator and rotor windings is proportional to a trigonometric function of the relative angle between the stator and the rotor. Thus, if a voltage is applied across the terminals of the stator winding, a voltage will be induced across the terminals of the rotor winding in proportion to a trigonometric function of the relative angle between the stator and the rotor. Since no discontinuities are produced in the field between the primary and secondary windings, enhanced accuracies are produced by the apparatus constituting this invention.

In the embodiment of the invention shown in FIGURES 1 to 9, inclusive, a stator winding 10 and a rotor winding 12 are respectively supported by hollow spherical members generally indicated at 14 and 16. For reasons which will be described in detail below, the members 14 and 16 are preferably made from a material having a high magnetic permeability. The member 14 is formed from a pair of hemispheres 18 and 20 (FIGURE 1), the hemisphere 18 being provided with a tongue 22 at its outer periphery and the hemisphere 20 being provided with a tongue 24 at its inner periphery to provide a press fit between the hemispheres. The hemisphere 20 is provided with slots 25 at its periphery so that a screwdriver can be inserted into the slots to pry apart the hemispheres if desired. A pair of diametrically disposed holes 26 having rounded edges is also provided in the spherical member 14. The holes 26 are rounded so that electrical leads can be inserted through the holes without damage to electrical insulation thereon. The spherical member 14 is also provided with an adidtional hole 27 for reasons which will be described in detail below.

The stator winding 10 is disposed against the inner surface 11 of the spherical member 14. The turns on the winding 10 are spaced relative to one another to provide along the inner surface 11 of the spherical member 14 a current density having a trigonometric relationship at progressive distances along the inner surface. This progressive distance winding, extending from a pole defining one extremity of the winding 10 to a pole defining the other extremity of the winding 10, defines an envelope extending between the upper and lower extremities of the winding 10 in FIGURE 1 as defined by the holes 26.

A current density having a trigonometric relationship with progressive distances along the inner surface 11 of the spherical member 14 may be achieved by separating adjacent turns on the winding 10 so that the projections on an axis 28 of the adjacent turns are equally spaced. The axis 28 may be defined as extending through the centers of the successive turns of the winding 10 and may be best seen in FIGURE 7. The equal spacing between the projections of adjacent pairs of turns on the axis 28 is illustrated at 30 in FIGURE 7. The spacing between adjacent turns in the winding 10 may be of the order of 0.005 inch along the axis 28 when the winding 10 is formed from No. 30 heavy Formvar insulated magnet wire and when the spherical member has a diameter of approximately 5 inches.

When the projections of adjacent turns on the axis 28 are equally spaced, a varying arcuate spacing is produced on the inner surface 11 of the spherical member 14 with respect to the arcuate distances between adjacent turns. For example, a pair of turns 10a and 10b (FIGURE 7) near a pole of the spherical member 14 is separated by a greater arcuate distance than a pair of turns 10c and 10d near the equator of the spherical member. This arcuate distance is measured along the envelope defined by the turns in the winding 10.

The winding 10 may be supported on the interior periphery of the spherical member 14 by first forming the two separate halves of the winding on the exterior peripheries of a pair of hemispheres which may be made from a material having a relatively low melting point.

For example, each hemisphere may be made from a metallic alloy designated as "Cerrobend" and having a melting point of approximately 130° F. An adhesive is then selectively applied to each winding and to the inner surfaces of the hemispheres 18 and 20, which are still separated at this time. Each hemisphere of the alloy having the low melting point may then be pressed against the inner surface of one of the hollow hemispheres 18 and 20 until the adhesive dries. The alloy having the low melting point is then heated so as to fuse the joint. The free ends of the windings at the equators of the hemispheres 18 and 20 are connected together at the hole 27 as by soldering to form the completed winding 10. The ends of the winding 10 at the poles are extended through the holes 26 and the hemispheres 18 and 20 are pressed together to form a spherical member 14.

The sperical member 16 may be formed in a manner similar to the spherical member 14 and is provided with a diameter slightly less than that of the spherical member 14. For example, the spacing between the windings 10 and 12 may be in the order of 0.012 inch when the spherical members have diameters in the order of 5 inches. However, since the winding 12 is supported on the external surface 13 of the spherical member 16, the winding may be formed on the spherical member after the two halves of the spherical member have been pressed together. The successive turns of the winding 12 may be disposed in shallow grooves 32 formed on the peripheral surface 13 of the spherical member 16.

The winding 12 is also provided with a plurality of turns which are spaced in a manner similar to the spacing of the turns on the winding 10. This causes the "axial" spacing between adjacent turns on the winding 12 to be equidistant when such spacings are projected on and measured along the axis 28 extending through the centers of the successive turns in the winding.

Figures 5, 6, 7, 11:
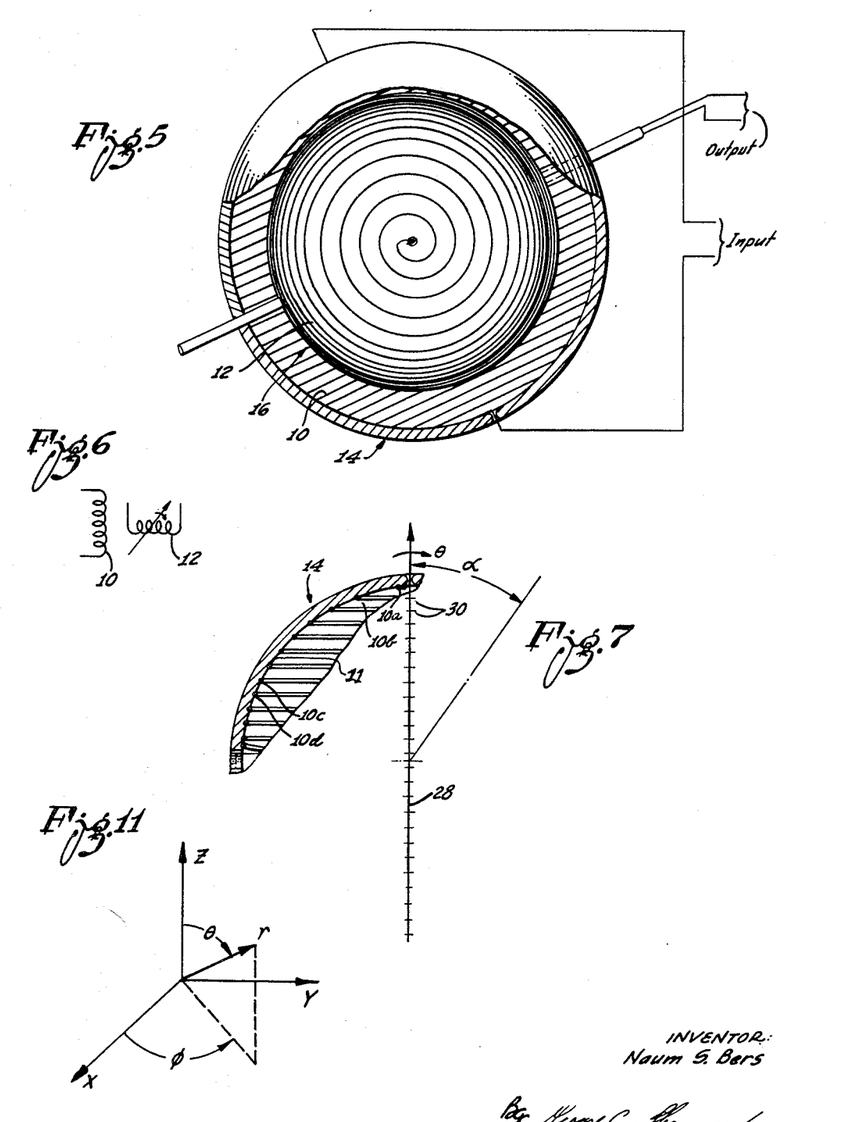
FIGURE 5 is a schematic perspective view of apparatus constituting one embodiment of this invention and particularly illustrates the relative disposition of the rotor and stator windings in an electromagnetic null position corresponding to a displacement of 90° between axes of windings, the sperical member supporting the stator winding being partially broken away to show the rotor and stator windings in some detail.
FIGURE 6 is a schematic diagram further illustrating the relative dispositions of the pair of windings shown in FIGURE 5.
FIGURE 7 is a fragmentary sectional view schematically illustrating the relative spacing between adjacent pairs of turns in one of the windings shown in the previous figures when such turns are projected on an axis defining the centers of the different turns in the winding.
FIGURE 11 is a schematic diagram illustrating the reference co-ordinate systems used in a mathematical analysis of the system constituting this invention.

In the positioning of the windings 10 and 12 in FIGURES 5 and 6, the axis defining the centers of the successive turns in the winding 10 is perpendicular to the corresponding axis defining the centers of the successive turns in the winding 12. For the present discussion this is considered to correspond to a zero positioning of the windings 10 and 12.

It will be appreciated that if special trigonometric and non-trigonometric functions are desired the distance between adjacent turns in the winding 10 when projected on the axis 28 does not necessarily have to be equal to the distance between adjacent turns in the winding 12 nor equal among themselves when projected on the corresponding axis for that winding. It will also be appreciated that the axis of the winding 12 does not necessarily have to be perpendicular to the axis 28 defining the centers of the successive turns in the winding 10 but may actually be transverse for all relative positions of the windings.

The inner spherical member 16 is supported on a shaft 36 (FIGURES 3 and 4) for rotation with the shaft relative to the outer sperical member 14. It is preferred that shaft 36 be made from a suitable non-magnetic material such as a plastic designated by the trade name of "Lucite." The sperical member 16 is secured to the shaft 36, the shaft being maintained in position relative to the outer sphere 14 by a collar 38 and a threaded clamp 39. The shaft 36 is internally bored as at 42 so that leads 44 can be inserted through this bore and soldered to the free ends of the winding 12 as at 46. The leads 44 are in turn electrically coupled to a pair of slip rings 48. Brushes 50 ride on the slip rings 48 and leads 52 extend from the brushes 50 to a pair of output terminals 54 across which the output voltage is measured.

The output terminals 54 and a pair of input terminals 56 are disposed on a side plate 60 which may be made from a suitable material having properties of electrical insulation such as that designated by the trade name of "Micarta." The input terminals 56 are connected to the free end of the winding 10 and are also connected to a source 62 of input voltage. The signals from the source 62 preferably have alternating characteristics of sinusoidal wave shape. For example, an alternating voltage having a root mean square value of approximately 6 volts and having a frequency of approximately 60 cycles per second may be applied to the winding 10 from the source 62.

The plate 60 and a plate 66 made from the same material as the plate 60 are disposed on opposite sides of the spherical member 14 and are maintained in spaced relationship as by studs 70. A calibrated vernier 72 is supported on the plate 66 as by screws 74. The vernier 72 is disposed adjacent a calibrated dial 76 which is supported on the shaft 36 for rotation with the shaft. By providing the calibrated dial 76 and the vernier 74, the angular rotation of the winding 12 relative to the winding 10 may be measured in degrees and minutes. For certain measurement and control applications the dial may be omitted and the shaft coupled to a rotating member.

The theoretical principle behind this invention is based on J. C. Maxwell's theory of the electromagnetic field developed by him some 60 years ago and published in his monumental treatise "Electricity and Magnetism." Special analysis done by him on spherical coils may be found in the second volume of the above reference. In its form, however, that analysis had obscure practical value in the field of angular transducers and was therefore neglected by subsequent workers in this domain.

This invention is based on a problem application of Maxwell's theory which led to the determination of the coupling between two spherical coils as applied to practical devices such as trigonometric function generators and angular transducers. Although certain assumptions were made in order to linearize the analysis, the results are valid for the practical model through proper quantitative and qualitative design of the components involved. Similar analyses have been performed by other authors for the case of coupling between cylindrical coils. A most concise treatise on this subject may be found in chapter 3 of White and Woodson's text book entitled "Electromechanical Energy Conversion" published in 1959. The inventor's notation is similar to the one used in this text in order to assist the reader with an adequate reference for the appreciation of this invention.

The coupling between two spherical windings may be calculated by making the following assumptions:

(1) The shells 14 and 16 have a high permeability such that the permeability may be considered to be infinite ($\infty$).

(2) The air gap between the windings 10 and 12 is considerably smaller than the radii of the windings. Thus, if the gap between the windings 10 and 12 is designated as $g$ and if the windings 10 and 12 are respectively provided with radii $b$ and $a$, $b \approx a \gg g$.

(3) The gap is much smaller than the wavelengths of the alternating signals applied to the winding 10 from the source 62. This is certainly true when signals having a frequency of approximately 60 cycles per second are applied to the winding 10 and when the winding 10 is separated from the winding 12 by a radial distance of 0.012 inch. When this relationship exists, all fields except for the quasi-static magnetic field may be neglected and consequently all but the first order terms in $$\left(\frac{g}{a}\right)$$

may be neglected.

(4) All of the losses in the windings 10 and 12 may be neglected. However, even if these losses were included in the analysis, the results would not be materially affected since these losses add only constant terms to the results.

(5) The spherical member 14 may be assumed to have an infinite thickness. This is a partical assumption since only negligible leakage has been found to exist outside of the spherical member 14 in a working model construction in accordance with the concepts of the invention.

When each of the windings 10 and 12 is wound with a uniform density along an axis defining the centers of the successive turns in the winding, the current density $\overline{K}_s$ on the surface of the spherical member 14 may be expressed as $$\overline{K}_s = \overline{i}_\phi I_s k_s \sin \theta$$

where $\theta$ = an angle measured from one of the poles in the stator winding 10, as best seen in FIGURES 7 and 11;

$I_s$ = the current flowing in the winding 10 as a result of an applied voltage to the winding from the source 62;

$k_s$ = the number of turns in the winding 10 per unit length along the axis defining the centers of the successive turns in the winding;

$\overline{i}_\phi$ = the unit circumferential current vector in a direction $\phi$ which is best seen in FIGURE 11.

In a highly permeable material, the magnetic field is zero. For example, the magnetic field within the spherical member 16 is zero. At the surface of a highly permeable material, the tangential magnetic field must vanish. Hence it is reasonable that for a short gap the predominant field is radial. The magnetic field produced in the gap between the windings 10 and 12 by the current in the winding 10 may be expressed as $$H_r{}^s = \frac{b}{g} I_s k_s \cos \theta$$

where $H_r{}^s$ = the radial component of the magnetic field produced in the gap, and the other terms have previously been defined. The tangential component of the magnetic field, $H_\theta{}^s$ is assumed to be zero. Similar relationships exist for the magnetic field in the gap as a result of the flow of current through the rotor winding 12.

The self-inductances of the stator winding 10 and of the rotor winding 12 may be respectively expressed as $\alpha_{ss}$ and $\alpha_{rr}$. The mutual inductance between the stator winding 10 and the rotor winding 12 may be expressed as $L_{sr}=L_{rs}$. From energy considerations:

$$\alpha_{ss}=\frac{4}{3}\frac{\pi\mu a^4}{g}k_s^2$$

$$L_{rr}=\frac{4}{3}\frac{\pi\mu a^4}{g}k_r^2$$

$$\alpha_{rs}=\alpha_{sr}=\frac{4}{3}\frac{\pi\mu a^4}{g}k_sk_r\cos\alpha$$

In the equations set forth in the previous paragraph, $\mu$ is the permeability of the gap between the windings 10 and 12 and may be considered to be a constant for each particular embodiment. As will be seen, $L_{ss}$ and $L_{rr}$ may be considered to be a constant for each particular embodiment and consequently $L_{rs}=L_{sr}$ may be considered to vary only in accordance with $\cos\alpha$. The angle $\alpha$ may be considered as the angle representing a particular position between the axis 28 defining the centers of the successive turns in the stator winding 10 and the corresponding axis defining the centers of the successive turns in the rotor winding 12. It extends in an annular direction corresponding to the angle $\theta$ in FIGURES 7 and 11.

In the positions of the windings 10 and 12 shown in FIGURE 5, no magnetic coupling is produced between the windings. In other words, none of the magnetic flux produced by the winding 10 links the winding 12 since the windings 10 and 12 are in perpendicular relationship to each other. This may be seen from the schematic showing in FIGURE 6 as to the relative dispositions of the windings 10 and 12.

Figures 8, 9, 13:
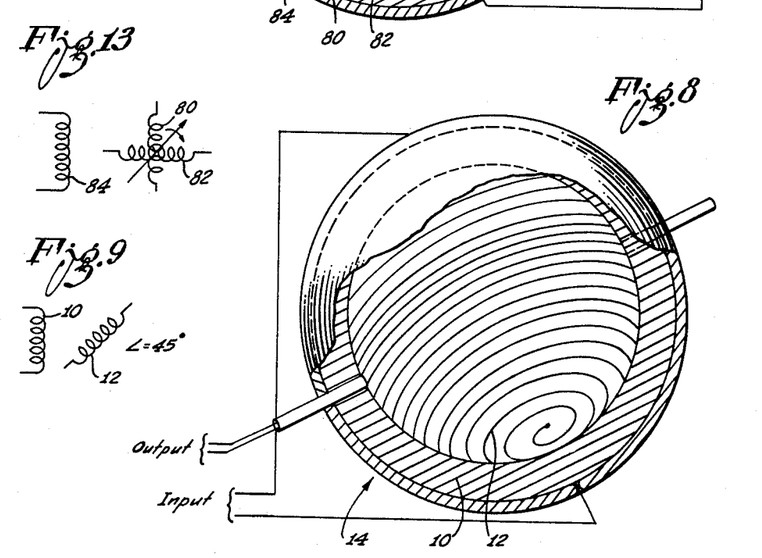
FIGURE 8 is a schematic perspective view similar to that shown in FIGURE 5 but with the rotor winding being displaced approximately 45° from the position shown in FIGURE 5.
FIGURE 9 is a schematic diagram further illustrating the relative dispositions of the rotor and stator windings in FIGURE 8.
FIGURE 13 is a schematic diagram further illustrating the relative dispositions of the two rotor windings and the single stator winding in the embodiment shown in FIGURE 12 when a zero displacement exists between the rotor and stator windings.

When the winding 12 is rotated with the shaft 36 relative to the winding 10 to the position shown in FIGURE 8, the windings 10 and 12 have a relative disposition such as schematically shown in FIGURE 9. This causes some of the flux produced by the winding 10 to link the turns of the winding 12. Continued rotation of the winding 12 with the shaft 36 causes increased amounts of the flux produced by the winding 10 to link the turns of the winding 12 until the winding 12 has rotated through an angle of 90°. Thereafter the amount of flux linking the winding 12 from the winding 10 decreases with continued angular displacements of the winding 12 through the next 90°.

Figures 1, 2, 10:
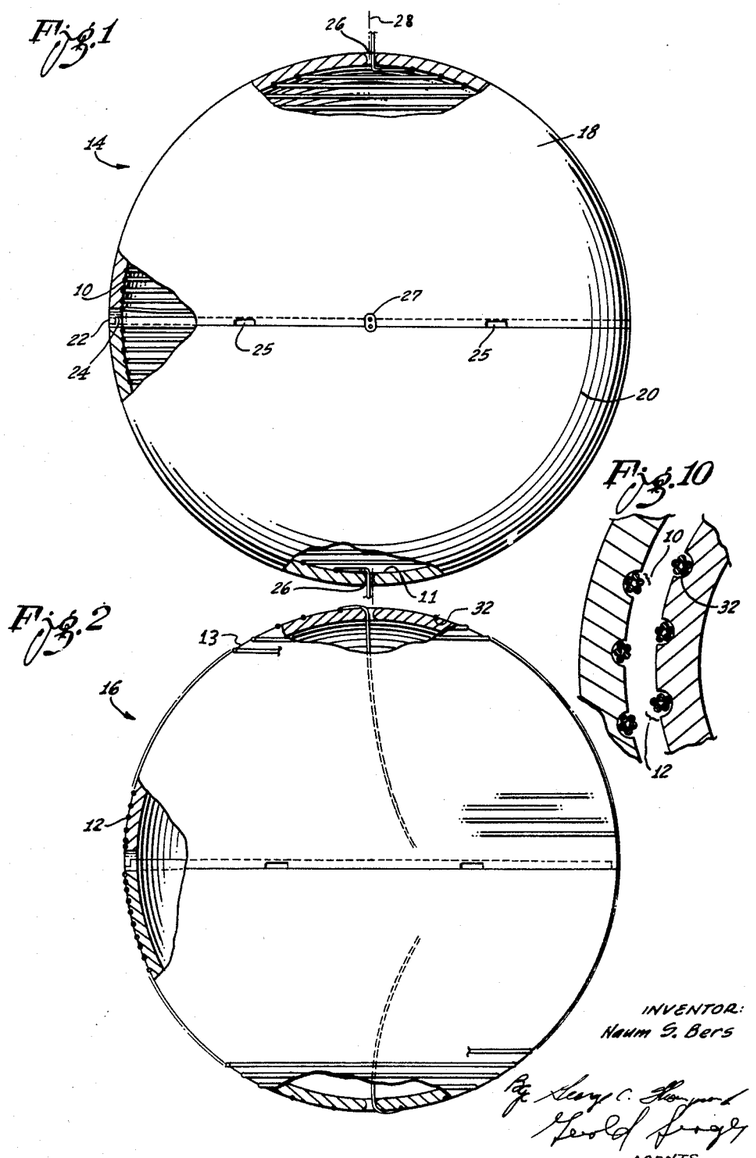
FIGURE 1 is an elevational view, partially broken away, of a stator and includes a showing of a first magnetic sphere and a stator winding supported within the first sphere against the inner wall of the sphere.
FIGURE 2 is an elevational view, partially broken away, of a rotor and includes a showing of a second magnetic sphere and a rotor winding supported on the external periphery of the second sphere.
FIGURE 10 is a fragmentary sectional view of a modification to the embodiment shown in the previous figures wherein each of the rotor and stator windings is formed by a plurality of windings in parallel.
Figure 3:
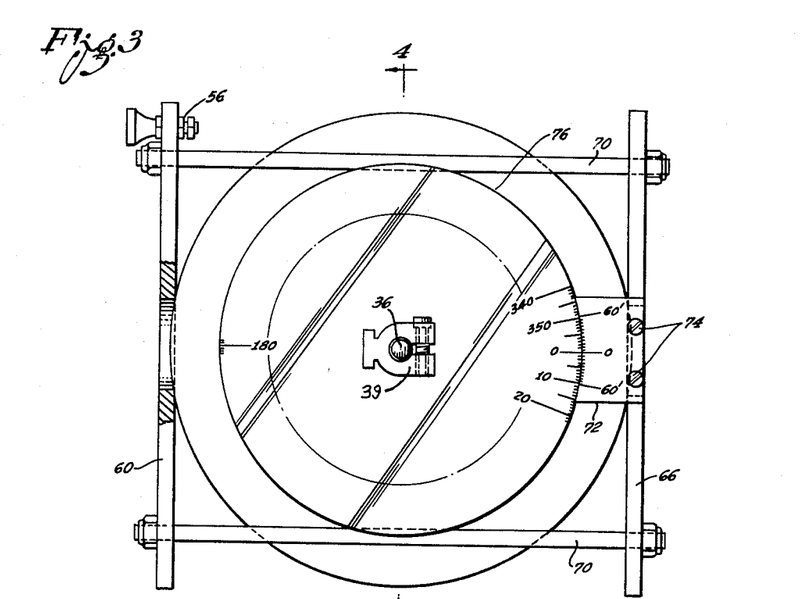
FIGURE 3 is an elevational view of the apparatus constituting this invention and particularly illustrates various members for providing a controlled angular rotation of the rotor shown in FIGURE 2 with respect to the stator shown in FIGURE 1.
Figure 4:
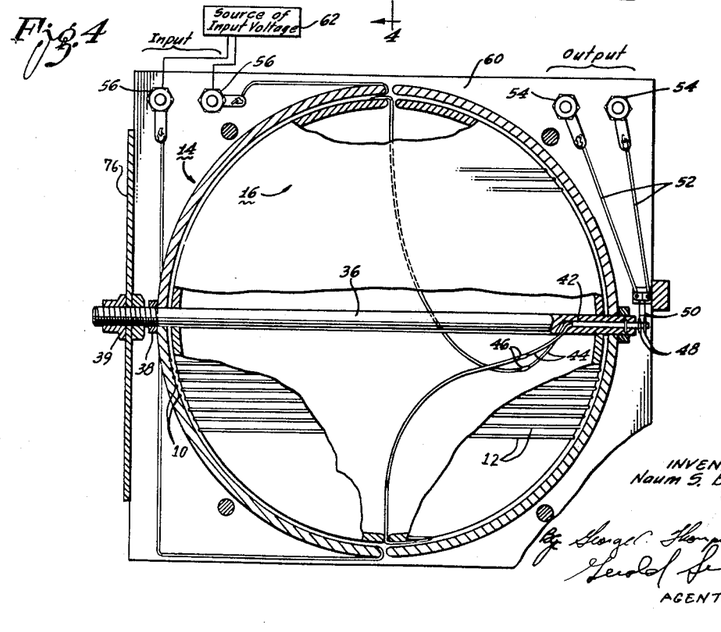
FIGURE 4 is a sectional view substantially on the line 4—4 of FIGURE 3.

As described mathematically above, the amount of flux linking the winding 12 in the position shown in FIGURES 8 and 9 is trigonometrically related to the amount of flux linking the winding 12 in the position shown in FIGURES 5 and 6, this trigonometric relationship being dependent upon the angle $\alpha$ shown in FIGURES 7 and 10. In this way, a signal is induced in the winding 12 wherein the amplitude of the signal is related in a trigonometric pattern to the angular displacement between the windings 10 and 12 from a reference position. If the relative positions of the windings 10 and 12 as shown in FIGURES 5 and 6 should be considered as a zero position, the trigonometric pattern of the signals induced in the winding 12 would be a sine pattern.

The apparatus described above has certain important advantages. Because of the particular configuration of the winding 10, a magnetic field is produced with no discontinuities in the space around the winding. Since no discontinuities are produced in the magnetic field, the winding 12 can be rotated with the shaft 36 to any desired position without affecting the accuracy of the signals induced in the winding. Furthermore, since the winding 12 is provided with a configuration corresponding to that of the winding 10, no discontinuities are produced in the output signals as a result of the reaction of the winding 12 to the magnetic flux linking the turns of the winding. This prevents errors from being produced in the apparatus constituting this invention such as are produced in the function generators now in use because of the occurrence of discontinuities in the magnetic fields in such function generators.

The accuracy of the output signals induced in the winding 12 is further enhanced by the method of forming the windings. This results from the fact that the turns of the windings 10 and 12 are respectively disposed on the flat surfaces of the spherical members 14 and 16 or in shallow grooves in the spherical members and are not disposed in deep grooves in such surfaces as in the trigonometric function generators now in use. The disposition of the turns of the turns of the windings 10 and 12 in deep grooves in the spherical members 14 and 16 may not be desirable since such grooves cause discontinuities to be produced in the magnetic field linking the windings. The use of deep grooves in the spherical members 14 and 16 is not necessary since only one turn of the winding is disposed in each groove. This is contrary to the trigonometric function generators now in use where a plurality of turns are disposed in each groove.

The trigonometric function generator described above has another important advantage. This results from the high mutual coupling which is produced between the windings 10 and 12 in comparison to the mutual coupling which is produced between the primary and secondary windings in the trigonometric function generators now in use. Because of this high mutual coupling between the stator winding 10 and the rotor winding 12 in the trigonometric function generator constituting this invention, the spacing between the windings 10 and 12 can be increased in comparison to the spacing between the windings in the trigonometric function generators now in use.

By increasing the spacing between the windings 10 and 12 in the trigonometric function generator constituting this invention, the effect of impedance reflected from the rotor winding 12 to the stator winding 10 upon the electrical coupling of loads to the rotor winding 12 becomes decreased in comparison to the impedance reflected from the secondary winding to the primary winding in the trigonometric function generators now in use. High reflective impedance effects are not desirable since they tend to reduce the accuracy in the operation of the trigonometric function generator.

An increase in the spacing between the windings 10 and 12 tends to decrease the effects of reflective impedance between the windings and is desirable for another reason. By increasing such spacing, a 1:1 turns ratio can be maintained between the windings 10 and 12. This tends to increase the amplitude of the signal induced in the winding 12 in comparison to the amplitude of the signal induced in the secondary winding of the trigonometric function generators now in use. Signals having a relatively low amplitude are induced in the secondary winding of the trigonometric function generators now in use since the secondary winding is provided with less turns than the primary winding in such function generators. A turns ratio of less than 1:1 is provided in the trigonometric function generators now in use in order to minimize the effect of reflected impedance from the secondary winding to the primary winding in such generators.

In this way, the effect of impedance reflected from the winding 12 to the winding 10 in the trigonometric function generator constituting this invention is maintained at a low value by increasing the spacing between the windings 10 and 12. However, signals having a relatively high amplitude are still induced in the winding 12 because the turns ratio between the windings 10 and 12 can be maintained at a 1:1 value.

Although the spherical members 14 and 16 are preferably made from a magnetic material of high permeability to obtain the production of a radial magnetic field in the gap between the windings, it should be appreciated that it is possible for the spherical members to be made from a non-magnetic material or a material of low magnetic permeability. When the spherical members 14 and 16 are made from a non-magnetic material or a magnetic material of low magnetic permeability, the field in the gap between the windings 10 and 12 will have an appreciable tangential component in addition to the radial field component. The effects of the tangential and radial magnetic fields can be combined by a conventional computer (not shown) to produce a control signal representing the angular displacement of the rotor winding 12 relative to the stator winding 10.

By forming the spherical members 14 and 16 from a non-magnetic material or a magnetic material of low magnetic permeability, the intensity of the magnetic field produced in the gap between the windings becomes considerably reduced. This reduction in the intensity of the magnetic field in the gap is facilitated by the production by each winding of leakage flux which is not able to link the other winding. In order to return the intensity of the magnetic field in the gap to the level produced with spherical members 14 and 16 of high magnetic permeability, the amplitude of the current flowing in the winding 10 may have to be materially increased.

When the spherical members 14 and 16 are made from non-magnetic material, both the windings 10 and 12 can be respectively disposed on the external peripheries of the members 14 and 16. It should also be appreciated that the spherical members 14 and 16 can be entirely eliminated under such circumstances by forming the windings 10 and 12 from stiff wire.

As may be seen in FIGURE 10, each of the windings 10 and 12 may be formed from a plurality of coils in parallel. By forming each of the windings 10 and 12 in this manner, the flow of current through the windings 10 and 12 can be correspondingly increased. This produces a corresponding increase in the strength of the field in the gap between the windings 10 and 12 such that an output signal of increased amplitude is induced in the winding 12. When each of the windings 10 and 12 is formed from a plurality of coils in parallel, the depth of the grooves for holding the individual turns of the coils may have to be increased.

The above discussion has proceeded on the basis of forming a trigonometric function generator by disposing a pair of windings in a concentric spherical relationship and with the turns in each winding disposed in an equally spaced relationship along an axis extending through the centers of the turns. By the provision of such a relationship, a continuous field is produced between the windings at all of the positions in the windings and an output signal trigonometrically related to the displacements of one of the windings relative to the other winding is obtained.

It should be appreciated, however, that other functions than trigonometric functions may be generated by disposing the successive turns in the windings 10 and 12 in different spaced relationships than those described above. For example, it may be possible to generate signals having characteristics representative of parabolic or elliptical functions by disposing the successive turns of the windings in different spaced relationships than those described above. Such functions may be generated by disposing the successive turns in each of the windings in a particular relationship to produce a continuous magnetic field in the space between the windings.

Although the description has proceeded above on the basis of using the windings 10 and 12 to produce a magnetic field linking the windings, it should be appreciated that each turn of the windings 10 and 12 may be considered as constituting a separate generator. Thus, the winding 10 may be considered as being formed from a first plurality of generators, and the winding 12 may be considered as being formed from a second plurality of generators. In view of the discussion in this paragraph, it will be seen that any type of generators can be used in place of the turns of the windings 10 and 12 provided that a continuous field is produced by the generators in the first plurality to link the generators in the second plurality and to obtain the production of a signal by the generators in the second plurality.

The discussion above has also proceeded on the basis that the shaft 36 defining the axis of rotation for the winding 12 is perpendicular to the axis 28 defining the centers of the successive turns in the winding 10 when the windings 10 and 12 have the zero displacement shown in FIGURES 5 and 6. It will also be appreciated that the shaft 36 may be transverse to the axis 28 when the windings 10 and 12 have the zero displacement shown in FIGURES 5 and 6. In such a transverse relationship, the axis defined by the shaft 36 may have a first component perpendicular to the axis 28 and may also have a second component parallel to the axis 28. Under such circumstances, only the first component of the axis defined by the shaft 36 will be instrumental in producing flux for the induction of signals in the winding 12.

A second winding may be disposed on the spherical member 16 in addition to the winding 12. This winding is illustrated at 80 in FIGURES 12 and 13 and is shown as being in perpendicular relationship to a winding 82 corresponding to the winding 12 in FIGURES 5 and 6. The winding 80 is provided with a plurality of turns which are disposed in a spaced relationship similar to that described above for the windings 10 and 12. The winding in FIGURES 12 and 13 corresponding to the winding in FIGURES 5 and 6 is illustrated at 84.

Figure 12:
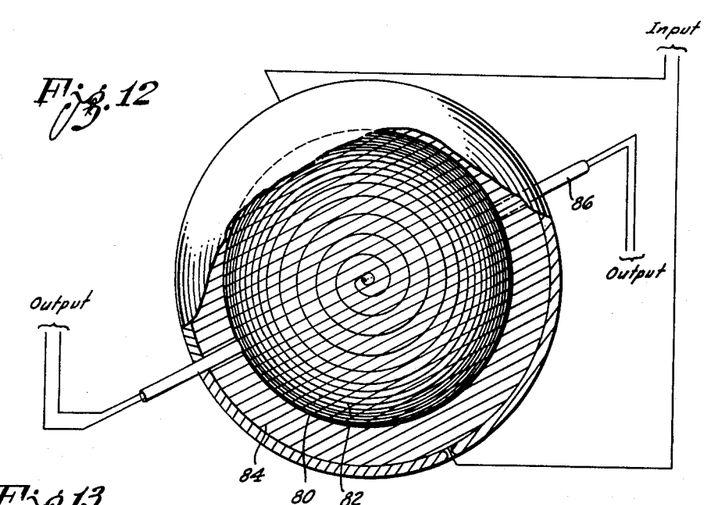
FIGURE 12 is a schematic perspective view similar to that shown in FIGURE 5 but illustrating apparatus modified from that shown in FIGURE 5 to constitute a second embodiment of the invention, this second embodiment including a second rotor winding disposed in perpendicular relationship to the first rotor winding and disposed in parallel relationship to the stator winding for a zero position of the embodiment.

By providing a perpendicular relationship for the windings 80 and 82 in the embodiment shown in FIGURES 12 and 13, signals can be produced by the winding 80 to indicate the angular movement of the winding relative to the winding 84. These signals can be expressed as $C = A \cos \alpha$, where $C$ = the signals produced by the winding 80;
$A$ = the signals introduced to the winding 84; and
$\alpha$ = the angular displacement of the winding 80 relative to the winding 84 on an axis corresponding to the shaft 36 in FIGURES 5 and 6 and corresponding to a shaft 86 in FIGURE 12.

Similarly the winding 82 produces trigonometric signals which may be expressed as $B = A \sin \alpha$, where B represents the signals produced in the winding 82.

The windings 80 and 82 may be connected as in a series relationship to produce a resultant signal representing the combined signals individually induced in the windings 80 and 82. It will be also appreciated that two perpendicular windings may be disposed on the spherical member 14 to serve as stator windings and that only a single winding may be disposed on the spherical member 16 to serve as a rotor winding. It will be further appreciated that the rotor windings can be disposed in transverse relationship to the stator windings in the zero relationship of the windings instead of in the parallel and perpendicular relationships shown in FIGURES 12 and 13.

Figure 14:
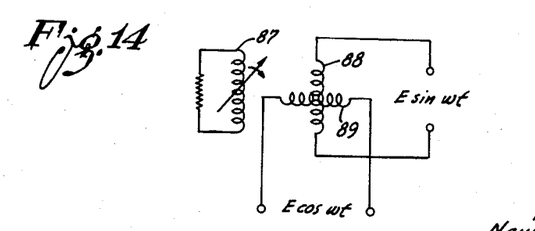
FIGURE 14 is a schematic diagram similar to that shown in FIGURE 13 but illustrates a modification of the embodiment shown in FIGURES 12 and 13 wherein only a single rotor winding and a pair of perpendicular stator windings are provided and wherein the rotor winding is short circuited to illustrate the feasibility of a two-phase spherical induction motor, characterized by two-phase stator excitation with a short circuited rotor winding.

FIGURE 14 illustrates a pair of stator windings 88 and 89 disposed in perpendicular relationship to each other and further illustrates a rotor winding 87. The rotor winding 87 is connected in a path of low impedance such as a short circuit, and the stator windings 88 and 89 are connected to receive input signals of different phase. By connecting the rotor winding 87 and the stator windings 88 and 89 in this manner, a traveling electromagnetic field of high intensity is produced by the stator windings, causing the rotor to rotate with its winding while this winding is continuously torqued to align itself with the traveling field; thus an alternating current induction motor is produced.

Figure 15:
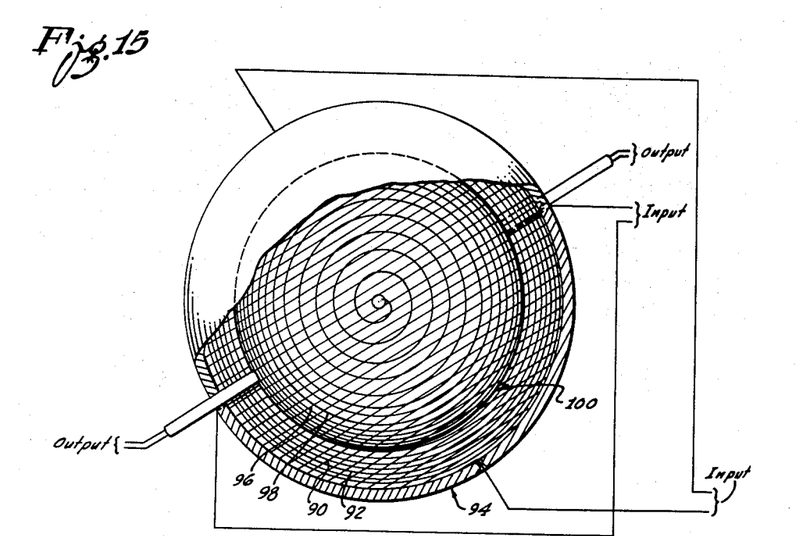
FIGURE 15 is a schematic perspective view similar to that shown in FIGURE 5 and illustrates a third embodiment of the invention wherein the embodiment includes a second stator winding in addition to the first stator winding and the pair of rotor windings and wherein the second stator winding is in perpendicular relationship to the first stator winding.
Figure 16:
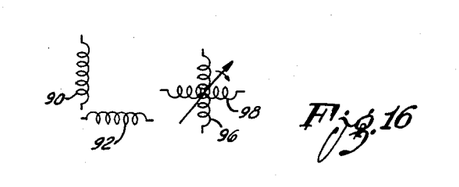
FIGURE 16 is a schematic diagram further illustrating the relative dispositions of the two stator windings and the two rotor windings in the embodiment shown in FIGURE 15.

Four windings are included in the embodiment shown in FIGURES 15 and 16. Two windings 90 and 92 are disposed on a spherical member 94 corresponding to the spherical member 14 in FIGURES 1, 2 and 3. The windings 90 and 92 are disposed on the spherical member 94 in perpendicular relationship to each other. Each of the windings 90 and 92 is provided with a plurality of turns which are spaced relative to one another in a manner similar to that described previously for the winding 10 in the embodiment shown in FIGURES 1 to 9, inclusive.

In like manner, two windings 96 and 98 are disposed on a spherical member 100 corresponding to the spherical member 16 in FIGURES 1 to 9, inclusive. The windings 96 and 98 are disposed in perpendicular relationship to each other in a manner similar to the windings 90 and 92. Each of the windings 96 and 98 is provided with a plurality of turns which are spaced relative to one another in a manner similar to that described above for the winding 10 in the embodiment shown in FIGURES 1 to 9, inclusive.

In the embodiment shown in FIGURES 15 and 16, the windings 96 and 98 are respectively parallel to the windings 90 and 92 in the zero position of the windings. Under such circumstances, the signals induced in each of the windings 96 and 98 can be expressed as $$C = A \cos \alpha - B \sin \alpha$$
$$D = B \cos \alpha + A \sin \alpha$$

where $A$ = the signal introduced to the winding 90;
$B$ = the signal introduced to the winding 92;
$C$ = the signal produced in the winding 96;
$D$ = the signal produced in the winding 98; and
$\alpha$ = the angle of rotation of the windings 96 and 98 relative to the windings 90 and 92.

Although the windings 96 and 98 are shown in FIGURES 15 and 16 as respectively being in parallel relationship to the windings 90 and 92, it will be appreciated that the windings 96 and 98 may be in transverse relationship to the windings 90 and 92 in the zero position of the windings.

The embodiments of the invention in which an exclusive property or privilege is claimed are defined as follows:

1. A spherical induction motor comprising: a stator; at least two spherical windings mounted on said stator, said windings adapted to be excited by polyphase alternating current; and at least one adjacent and concentric spherical rotor winding having two end portions, said rotor windings being disposed symmetrically about a radial axis of said spherical rotor to produce equally spaced points at the intersection of the line projections of each turn on said axis, said rotor windings including a connection across said end portions, said connection comprising a path of low impedance relative to the impedance of said rotor winding.

2. A spherical induction motor comprising a stator having at least two spherical windings,
   said windings adapted to be excited by polyphase alternating current, and
   a spherical rotor having windings wound on the periphery of said rotor, said rotor windings being disposed symmetrically about a radial axis of said spherical rotor to produce equally spaced points at the intersection of the line projections of each turn on said axis.

3. A spherical induction motor comprising a spherical stator having at least two spherical stator windings wound on the internal periphery of said stator sphere,
   said windings adapted to be excited by polyphase alternating current, and
   a spherical rotor having windings wound on the periphery of said rotor, said rotor windings being disposed symmetrically about a radial axis of said spherical rotor to produce equally spaced points at the intersection of the line projections of each turn on said axis.

4. A spherical induction motor according to claim 3 in which said spherical stator windings are disposed symmetrically about a radial axis of said sphere to produce equally spaced points at the intersection of the line projections of each turn on said axis.

References Cited by the Examiner
UNITED STATES PATENTS

| | | | |
|---|---|---|---|
| 1,559,920 | 11/25 | Stewart | 318—243 |
| 1,663,010 | 3/28 | Kaisling | 336—127 |
| 2,201,453 | 5/40 | Putnam | 336—127 |

ORIS L. RADER, *Primary Examiner.*

MILTON O. HIRSHFIELD, *Examiner.*